UNITED STATES PATENT OFFICE.

CARL SCHEIBLER, OF BERLIN, GERMANY.

MANUFACTURE OF PHOSPHATES FROM SLAGS.

SPECIFICATION forming part of Letters Patent No. 353,825, dated December 7, 1886.

Application filed May 2, 1883. Serial No. 93,719. (No specimens.)

*To all whom it may concern:*

Be it known that I, CARL SCHEIBLER, professor of chemistry, residing in Berlin, Kingdom of Prussia, Germany, have invented new and useful Improvements in the Method of Utilizing Slags Obtained in the Dephosphorization of Iron, of which the following is a specification.

My invention relates to the method of utilizing phosphatic slags described in the specification of my application filed April 21, 1883, Serial No. 92,475, since patented on June 12, 1883, No. 279,475, and according to which phosphates of lime and magnesia are obtained from the slags by a process comprising a pulverization and roasting of the slag, a treatment of the same by a limited quantity of muriatic acid diluted with at least nine parts of water to one part of acid of 21° Baumé, and a precipitation of the alkaline-earth basic phosphates by lime or magnesia.

The object of the improved method to be described in the following consists, first, in producing from the slags, by means of muriatic acid diluted less than heretofore, alkaline-earth phosphates, either mixed with phosphates of iron and manganese and with silica or nearly free of these substances; secondly, in converting the phosphates of iron and manganese proceeding from this process into phosphates of lime or magnesia, or of both together; and, thirdly, in recovering the iron and manganese of the slags in the state of oxides, together with some compounds of lime and magnesia.

The slags obtained in the dephosphorization of iron by the Thomas Gilchrist process or other similar processes, either in the basic-lined Bessemer converter or in basic-lined reverberatory furnaces, are powdered and thereupon roasted in oxidizing-flame in the same manner as has been described in my former specification, the roasting process having the purpose, on one hand, to convert the protoxides of iron and manganese into sesquioxides or combinations of sesquioxides and protoxides, and, on the other hand, to effectuate that the part of the phosphoric acid combined in the unroasted slag with iron and manganese be transferred to the lime and magnesia of the slag, so as to form alkaline-earth phosphates therewith, and that the silica of the slag be brought into a state in which it will be least inclined to gelatinize when the slag is treated with diluted acid. The roasted slag is washed, and thereby freed from the caustic lime which it contains, and which may subsequently be utilized in the precipitation of the phosphates from the acid solutions.

Hereafter the slag is dissolved in muriatic acid which is less diluted than required in the former method, the dilution being limited solely by the condition that the main portion of the silica of the slag be dissolved, together with the phosphates of lime and magnesia, and that the silica, having thus passed into the solution, will remain dissolved and not separate out spontaneously in gelatinous state. By dissolving the greater portion of the silica the residue, consisting, mainly, of oxides of iron and manganese and of magnesia and lime, will be comparatively free from silica, and therefore the more valuable for its utilization in the manufacture of iron.

When acids are employed which are less diluted than with nine parts of water to one part of acid, a considerable quantity of the iron and manganese will pass into the solution, together with the silica and the alkaline-earth phosphates, the said quantity being greater in proportion as the degree of dilution is less and the quantity of acid is increased. The reason herefor is to be found in the fact that the acids of higher titer act on the slag-powder under development of heat rising with their degree of concentration, in consequence whereof the reactions take place in too violent a manner.

As regards the silica, I have to observe that its tendency to gelatinize in the solution diminishes in the measure as the slag is roasted at a higher temperature. It is therefore advisable to heat the slag in the roasting process to a bright-red heat.

In addition to the greater strength of the acid, a somewhat larger quantity thereof may be used than formerly—*i. e.*, more than is required according to the analysis of the slag for extracting therefrom the earth phosphates and the silica only. It is consequently not required to operate in this respect as carefully as is necessary according to my first method. By the excess of acid an amount of iron and manganese is dissolved which does not separate out again during the dissolving process. The solution is separated from the residue in any suitable manner. The residue being very heavy, this operation offers no difficulty. The next step consists in precipitating the phosphates and the silica. This precipitation is preferably carried out by milk of lime; but, instead of lime, magnesia or a mixture of lime and magnesia—such as burned dolomite or the carbonates thereof—may be employed. When the solutions are completely neutralized at once by adding a sufficient quantity of the said substances, the precipitates produced will consist of phosphates of lime or of phosphates of lime and magnesia, together with phosphates of iron and manganese and silica. These precipitates are, however, of inferior value, as their percentage of phosphoric acid is comparatively low on account of the silica which they contain, and as the phosphates of iron and manganese represent impurities which may be considered prejudicial to their application. I therefore prefer to separate from each other, by means of a fractional precipitation, the substances which have passed into the solution. For this purpose weak milk of lime or magnesia is added to the acid solution, at first in a quantity which is sufficient for precipitating the phosphates of iron and manganese, together with a small portion of the alkaline-earth phosphates only. Hereupon a further quantity of milk of lime or magnesia is added to the solution drawn off from the first precipitate; but the addition thereof is discontinued before the solution shows an alkaline reaction—that is, the solution is allowed to remain slightly acid. This will cause the main portion of the alkaline-earth phosphates to separate out, while the greater part of the silica yet remains in solution. By thereupon completely neutralizing the remaining solution the silica is thrown to the bottom, either alone or together with an amount of magnesia, manganese, and lime, or of any of these substances.

If preferred, the alkaline-earth basic phosphates may be precipitated, together with the silica, by at once neutralizing the liquid separated from the compounds of iron and manganese.

The precipitates are separated from the liquid by allowing them to settle and decanting the latter, or by filtration on filter-presses. They are thereupon washed and eventually dried.

The phosphoric acid contained in the phosphates of iron and manganese obtained in the first stage of the process of fractional precipitation may be rendered profitable in the following manner: The phosphates of iron and manganese are mixed with lime or magnesia or the carbonates thereof and roasted at a red heat. This causes a transition of the phosphoric acid from the iron and manganese to the lime and magnesia to take place, whereby phosphates of lime and magnesia are formed. These are subsequently extracted in a like manner as the alkaline-earth basic phosphates contained in the roasted slag. The residue, which consists, mainly, of oxides of iron and manganese, may be utilized for the production of colors; or it is employed, together with the like primary residue, in the manufacture of iron.

I do not claim, broadly, the treatment of phosphatic slags by roasting, dissolving, and precipitating, as I am aware that this has heretofore been done.

I claim as my invention—

The treatment of slags obtained in the lime basic process of dephosphorization of iron, consisting in roasting the slag in an oxidizing-flame, reducing the same to powder, adding muriatic acid of the described degree of dilution, and thereby dissolving the main portion of the silica and alkaline-earth phosphates and a part of the oxides of iron and manganese, and then fractionally precipitating the elements of the solution, as described, whereby are obtained separately the phosphates of iron and manganese, and then the alkaline-earth phosphates, with or without the silica, separating the phosphorus from the iron and manganese by oxidation of the above-resulting phosphates of iron and manganese, as described, and then dissolving and precipitating, whereby are obtained an additional amount of alkaline-earth phosphates and an amount of metallic oxides, substantially as set forth.

In testimony whereof I have signed my name to this specification in the presence of two subscribing witnesses.

CARL SCHEIBLER.

Witnesses:
HENRY SPRINGMANN,
B. ROI.